(12) United States Patent
Roelle et al.

(10) Patent No.: US 6,983,590 B2
(45) Date of Patent: Jan. 10, 2006

(54) SECONDARY AIR INJECTION DIAGNOSTIC SYSTEM USING PRESSURE FEEDBACK

(75) Inventors: Matthew J. Roelle, Menlo Park, CA (US); Martin L. Hall, Holly, MI (US); Daniel H. Hooker, Livonia, MI (US); Gary E. Johnston, Highland, MI (US); Kevin E. Person, Highland, MI (US); Jeffrey M. Polidan, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/277,475

(22) Filed: Oct. 22, 2002

(65) Prior Publication Data

US 2004/0074453 A1    Apr. 22, 2004

(51) Int. Cl.
    *F01N 3/00*         (2006.01)

(52) U.S. Cl. .............................. 60/289; 60/274; 60/277; 60/290

(58) Field of Classification Search .................. 60/274, 60/276, 277, 289, 290, 300
See application file for complete search history.

(56) References Cited

U.S. PATENT DOCUMENTS

| | | | |
|---|---|---|---|
| 3,894,984 A * | 7/1975 | Toda et al. ..................... 60/277 |
| 5,706,653 A * | 1/1998 | Shoji et al. ..................... 60/289 |
| 5,743,085 A * | 4/1998 | Takaku et al. ................. 60/289 |
| 5,782,086 A * | 7/1998 | Kato et al. ..................... 60/274 |
| 5,814,283 A * | 9/1998 | Matuoka et al. ............... 60/289 |
| 5,852,929 A * | 12/1998 | Kato et al. ..................... 60/277 |
| 2003/0061805 A1 * | 4/2003 | Hirooka et al. ............... 60/277 |

\* cited by examiner

*Primary Examiner*—Tu M. Nguyen
(74) *Attorney, Agent, or Firm*—Christopher DeVries

(57) ABSTRACT

A diagnostic system according to the present invention diagnoses system failure of a secondary air injection system. The secondary air injection system includes a pump that provides air to an exhaust system via a conduit and a valve that controls the flow of air through the conduit. A pressure sensor measures pressure in the conduit. A controller predicts pressure in the conduit during first, second and third operational phases of the secondary air injection system. The controller compares the measured pressure to the predicted pressure to evaluate operation of the secondary air injection system. During the first phase, the secondary air injection system is used to reduce vehicle emissions. During the second phase, the valve is shut while the pump is on. During the third phase, the pump is turned off while the valve is closed.

26 Claims, 6 Drawing Sheets

US 6,983,590 B2

SECONDARY AIR INJECTION DIAGNOSTIC SYSTEM USING PRESSURE FEEDBACK

FIELD OF THE INVENTION

The present invention relates to secondary air injection systems of vehicles, and more particularly to secondary air injection diagnostic systems that employ pressure feedback.

BACKGROUND OF THE INVENTION

An engine control module of an internal combustion (IC) engine controls the mixture of fuel and air that is supplied to combustion chambers of the IC engine. After the spark plug ignites the air/fuel mixture, combustion gases exit the combustion chambers through exhaust valves. The combustion gases are directed by an exhaust manifold to a catalytic converter.

During certain engine operating periods, combustion gases that enter the exhaust manifold are not completely burned. The combustion gases will continue to burn in the exhaust manifold only if a sufficient amount of oxygen is available. Secondary air injection systems are typically used to inject additional air into the exhaust flow to allow combustion to continue, which reduces vehicle emissions. More particularly, prolonged combustion lowers levels of hydrocarbon (HC) and carbon monoxide (CO) emissions that are output to a catalytic converter. The additional air that is injected into the exhaust system also ensures that an adequate supply of oxygen is provided to the catalytic converter for further oxidation of HC and CO.

On-board diagnostics that are specified by government regulations require diagnostic systems that detect malfunctions in the secondary air injection systems of vehicles. Manufacturers must detect secondary air system malfunctions that cause vehicle emissions to exceed specified emission levels.

SUMMARY OF THE INVENTION

A diagnostic system according to the present invention diagnoses system failures of a secondary air injection system. The secondary air injection system includes a pump that provides air to an exhaust system via a conduit and a valve that controls the flow of air through the conduit. A pressure sensor measures pressure in the conduit. A controller predicts pressure in the conduit during first, second and third operational phases of the secondary air injection system. The controller compares the measured pressure to the predicted pressure to evaluate the operation of the secondary air injection system.

In other features, the pressure sensor is located between the pump and the valve. During the first phase, the secondary air injection system is used to reduce vehicle emissions. During the second phase, the valve is shut while the pump remains on. During the third phase, the pump is turned off while the valve remains closed.

In still other features, during the first phase, the controller calculates a condition quality. The controller calculates a first pressure difference between the measured pressure and the predicted pressure. The controller calculates an average pressure difference by integrating a product of the first pressure difference and the condition quality, integrating the condition quality, and dividing the integrated product by the integrated condition quality. The controller compares the average pressure difference to first and second thresholds and declares system failure if the average pressure difference is either less than the first threshold or greater than the second threshold.

In yet other features, during the second phase, the controller closes the valve while the pump is on. The controller calculates the average pressure difference, compares the average pressure difference to a third threshold, and declares a valve failure if the average pressure difference is less than the third threshold.

In other features, during the third phase, the controller turns the pump off while the valve is closed. The controller calculates the average pressure difference, compares the average pressure difference to a fourth threshold, and declares a pump failure if the average pressure difference is greater than the fourth threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The secondary air injection diagnostic system according to the present invention monitors the performance of the secondary air injection system by monitoring pressure. The diagnostic system generates a predicted pressure. If the measured pressure deviates from the predicted pressure, the system is flagged as malfunctioning.

For example, the diagnostic system predicts a normalized system pressure of 8 kPa. A system with a disabled pump has a measured normalized pressure near 0 kPa. This deviation indicates a system malfunction. Similarly, if a control valve is electronically disabled and does not open, the measured normalized system pressure is about 15 kPa. A deviation above the predicted pressure value indicates a system malfunction. The secondary air injection diagnostic system is also capable of detecting partially blocked or partially leaking secondary air systems as will be described more fully below.

Figure 1:
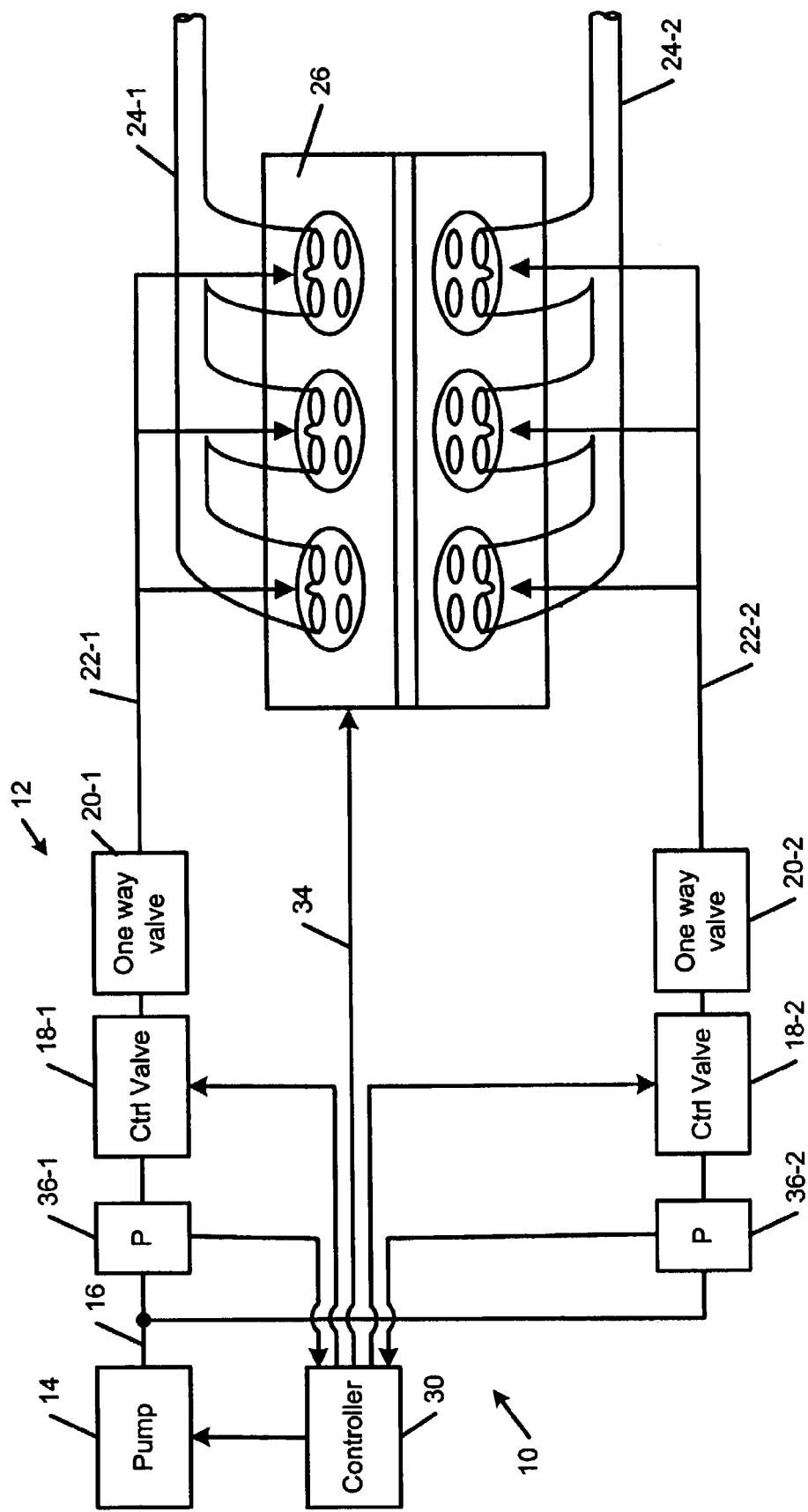
FIG. 1 is a functional block diagram of a secondary air injection diagnostic system according to the present invention.

Referring to FIG. 1, a secondary air injection diagnostic system 10 according to the present invention for a secondary air injection system 12 is shown. The secondary air injection system 12 includes a pump 14 that is connected by one or more conduits 16 to control valves 18-1 and 18-2 and one way valves 20-1 and 20-2. Additional conduit 22-1 and 22-2 directs air into an exhaust manifold 24-1 and 24-2 of an engine 26. As can be appreciated, valves 18-2 and 20-2, conduit 22-2 and exhaust manifold 24-2 are optional.

The secondary air injection system 12 includes a controller 30 that receives engine operating data and optionally provides engine inputs via control line 34. Pressure sensors 36-1 and 36-2 measure pressure in the conduit 16. The pressure sensor 36-2 is optional. Preferably, the pressure sensors 36-1 and 36-2 are located before the control valves 18-1 and 18-2, respectively. However, the pressure sensors 36 may be located in other positions between the pump and the exhaust manifold 24. If there are two banks, one sensor is placed in the conduit between the split and each valve.

The diagnostic system 10 tests three different phases of operation of the secondary air injection system 12. A first operational phase occurs while the secondary air injection system 12 is being used to reduce cold-start emissions. The pump is turned on and the valve is open or modulated. The first phase tests normal secondary air system operation. A second phase confirms that the control valves 18-1 and 18-2 have closed. A third phase confirms that the pump shut down. The present invention accurately predicts pressure to allow a proper diagnosis of system operation.

Prior to engine rotation, the pressure sensors 36 provide a baseline pressure value. The baseline pressure value is used to calculate the barometric pressure and to normalize the dynamic pressure value, which is the pressure after the engine begins operating. Normalization eliminates steady-state pressure signal errors as well as the barometric pressure.

The diagnostic system 10 also predicts the secondary air injection system pressure. The prediction is based on a simple model that approximates the secondary air injection system dynamics. When the pump 14 is turned on, the pump 14 component of the system pressure is calculated. The pump pressure is preferably based on the system voltage and barometric pressure. A filter, such as a Kalman filter or any other suitable filter, is applied to the pump pressure to approximate system dynamics. When the valve(s) 18 are commanded on, the valve component of the system pressure is calculated. The valve de-pressure is based on the primary mass-airflow of the engine 26. The valve de-pressure is also filtered, using a Kalman filter or any other suitable filter, to approximate system dynamics. The pump pressure and valve de-pressure are added together and filtered, using a Kalman filter or any other suitable filter. The predicted pressure value is used by each phase of the diagnostic.

In the first phase, the diagnostic system 10 tests the normal operation of the system. During the first phase while the secondary injection air is used to control emissions, an average pressure difference is used to evaluate system performance. To calculate the average pressure difference, the measured normalized pressure is compared to the predicted pressure. Operating conditions are evaluated for quality (condition quality) and a multiplier between 0 and 1 is assigned (0 associated with poor conditions and 1 with perfect conditions). The condition quality is multiplied by the difference between the measured pressure and predicted pressure. The product and the instantaneous condition quality are integrated. The average pressure difference (between the measured and predicted pressure) is the integrated instantaneous-pressure-difference divided by the integrated instantaneous-condition-quality.

If enough favorable operating conditions have been encountered (the integrated condition quality is sufficiently large and there is enough reliable data) when the secondary air is done being used to control emissions, the average pressure difference is compared to minimum and maximum thresholds to determine whether the secondary air injection system 12 is operating in an acceptable manner. If the system 12 has two valves 18 and two pressure sensors 36, the variation between the two pressure measurements is averaged. If sufficient information is available when the secondary air is done being used to control emissions, the average sensor variation is compared to the thresholds to determine whether the system 12 is operating in an acceptable manner.

When unacceptable system operation is detected (for either pressure-model differences or sensor-sensor variations), the diagnostic system 10 preferably stops testing immediately and does not perform testing in the second or third phases. A system failure is reported and the diagnostic system 10 does not run until the next vehicle start. However, the secondary air injection passes the first phase test if a failure is not detected and enough favorable operating conditions have been encountered when the control system is finished using secondary injection air. After operation of the pump 14 is terminated for emissions control purposes, the diagnostic system 10 tests the second phase.

During the second phase, the diagnostic system 10 determines whether the control valves 18 shut properly. The control valves 18 preferably shut when the controller 30 is finished using secondary injection air to control vehicle emissions. The pump 14 remains on and the pressure should rise quickly. The diagnostic system 10 calculates a new average pressure difference in a manner that is similar to the first phase. If the pressure difference is sufficiently large (that is, the measured pressure is larger than the predicted pressure threshold) and the diagnostic system 10 has accumulated enough reliable data (based on operating conditions as in the first phase), the diagnostic system 10 declares the valve(s) 18 to be shut. The controller 30 turns the pump 14 off. Further, the diagnostic system 10 stops testing and waits for the third phase. If the pressure difference is small (or negative) and enough reliable data has been accumulated when the controller 30 disengages the pump 14, the diagnostic system 10 assumes there is a failure in the secondary air injection system. The diagnostic system 10 reports a valve failure and does not test the third phase.

In the third phase, the diagnostic system 10 confirms that the pump 14 has shut-off properly. When the pump 14 and the control valve 18 are commanded off, the diagnostic system 10 calculates a new average pressure difference and accumulates data as described above in the first and second phases. If sufficient data has been gathered and the average pressure difference is sufficiently small (or negative), the pump 14 is assumed to be off. If all of the phases were passed, the diagnostic system 10 reports that the secondary air injection system 12 is operating correctly. If sufficient data has been gathered, a time limit is reached, and the pressure difference is still large, the diagnostic system 10 declares the pump 14 is operating incorrectly and reports the failure.

Each phase of testing can make a local pass/fail decision if sufficient data is available. As soon as any phase encounters a failure, the diagnostic system 10 reports the appropriate failure and completes operation until the next vehicle start. The diagnostic system 10 preferably reports a pass for each test after each test passes locally.

Figure 2:
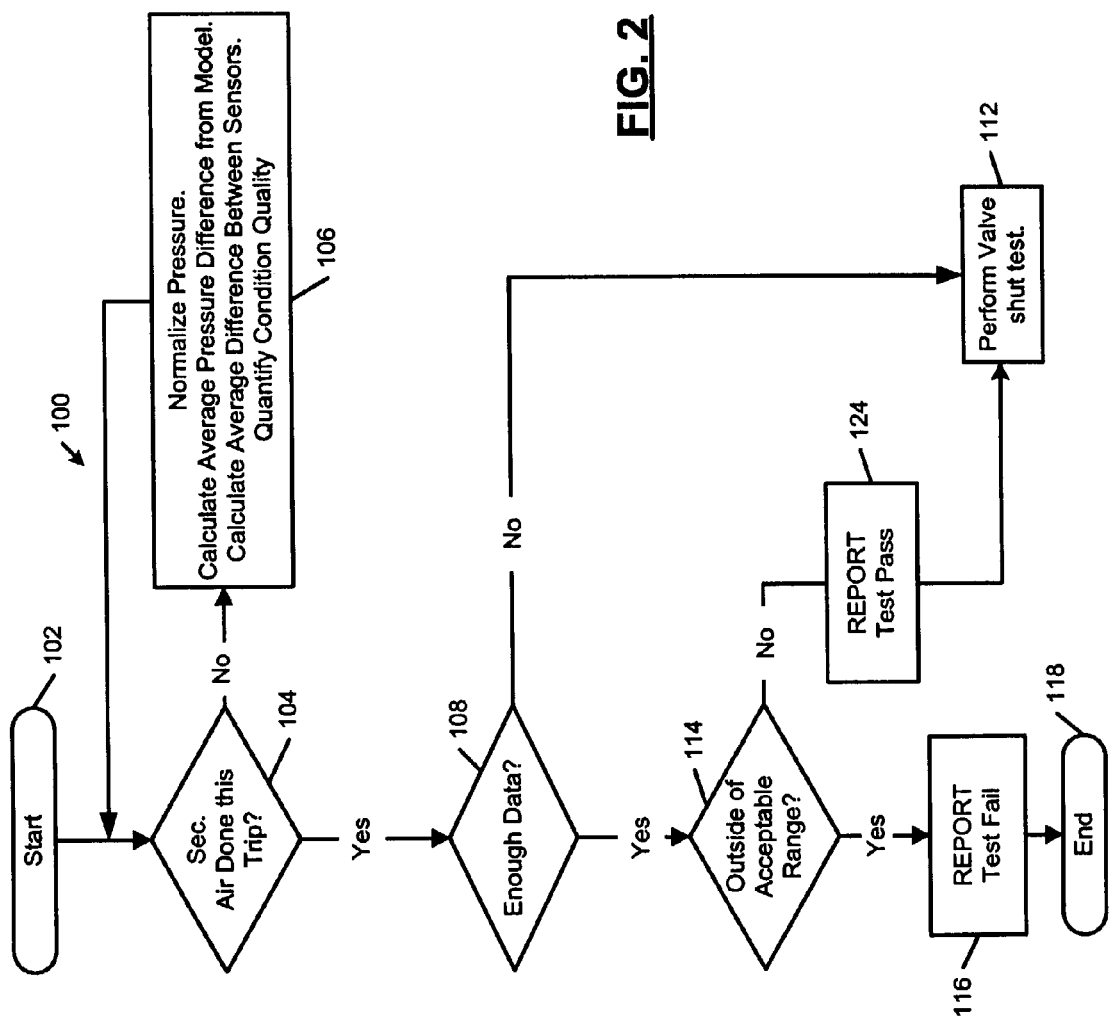
FIGS. 2–4 are flowcharts illustrating steps that are performed by the secondary air injection diagnostic system according to the present invention.

Referring now to FIG. 2, steps for operating the controller 30 are shown generally at 100. In step 102, control begins. In step 104, the controller 30 determines whether secondary air was performed this trip. If not, the controller 30 normalizes the pressure, calculates average pressure difference from a model, calculates average difference between sensors, and quantifies condition quality in step 106. Control continues from step 106 to step 104. If step 104 is true, the controller 30 determines whether there is enough data in step 108. If not, the controller 30 performs a valve shut test in step 112. If step 108 is true, the controller 30 determines whether the data is outside of an acceptable range in step 114. If step 114 is true, the controller 30 reports a test failure in step 116 and control ends in step 118. If step 114 is false, the controller 30 reports a test pass in step 124. Control continues from step 124 to step 112 where control performs the valve shut test.

Figure 3:
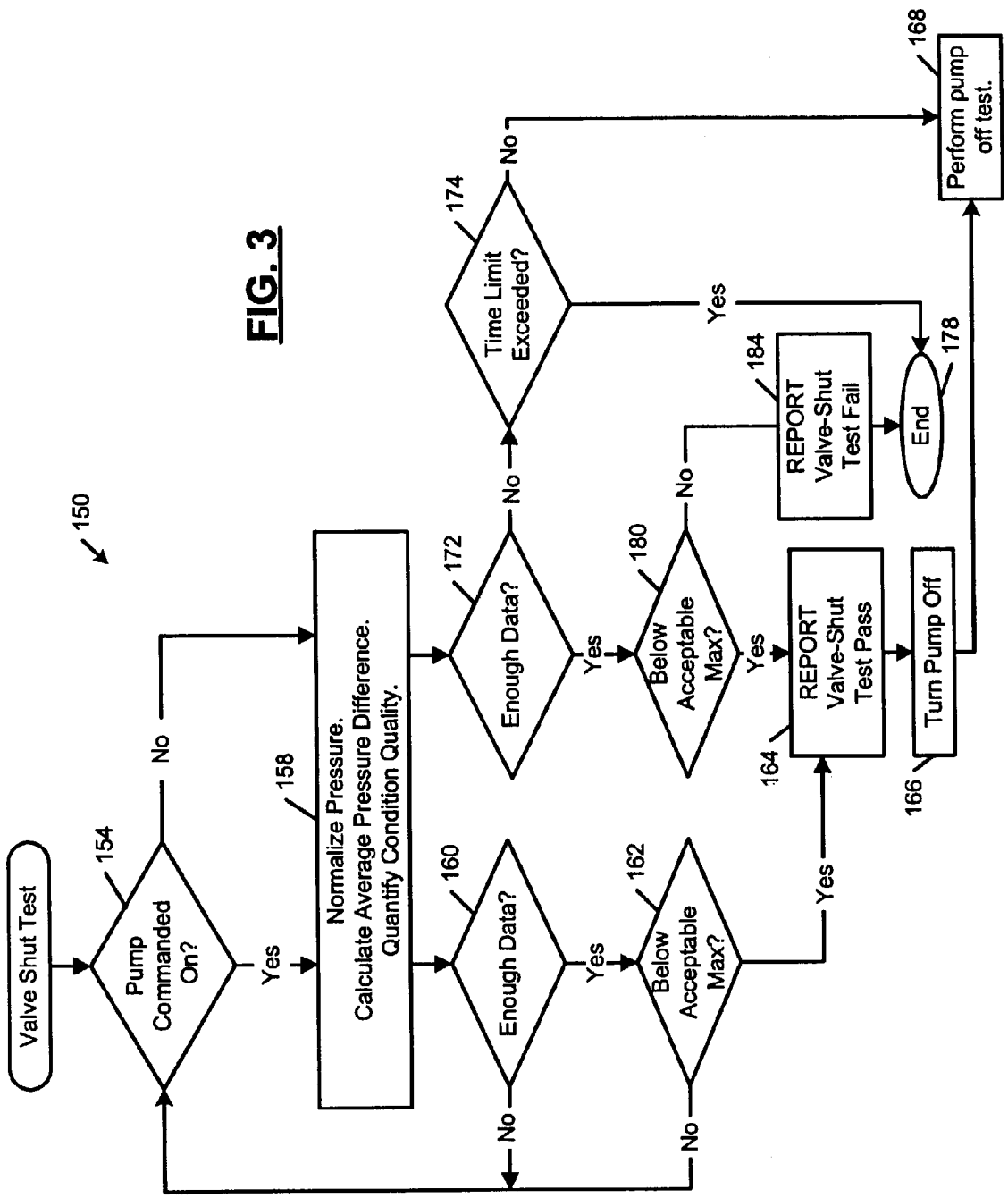

Referring now to FIG. 3, the valve shut test is shown generally at 150. In step 154, the controller 30 determines whether the pump has been commanded on. If true, the controller 30 normalizes the pressure, calculates average pressure difference, and quantifies condition quality in step 158. Control continues from step 158 to step 160 where the controller 30 determines whether there is enough data. If not, control loops back to step 154. If step 160 is true, control determines whether the data is below an acceptable maximum in step 162. If not, control loops back to step 154. If step 162 is true, control continues with step 164 and reports a valve shut test pass. In step 166, the pump is turned off. In step 168, a pump off test is performed.

If step 154 is false, control continues with step 158 and step 172. In step 172, the controller 30 determines whether there is enough data. If step 172 is false, the controller 30 determines whether a time limit has been exceeded in step 174. If step 174 is false, control continues with step 168. If step 174 is true, control ends in step 178.

If step 172 is true, the controller 30 determines whether the data is below an acceptable maximum in step 180. If step 180 is true, the controller 30 continues with step 164. If step 180 is false, the controller 30 reports a valve shut test fail in step 184. Control ends in step 178.

Figure 4:
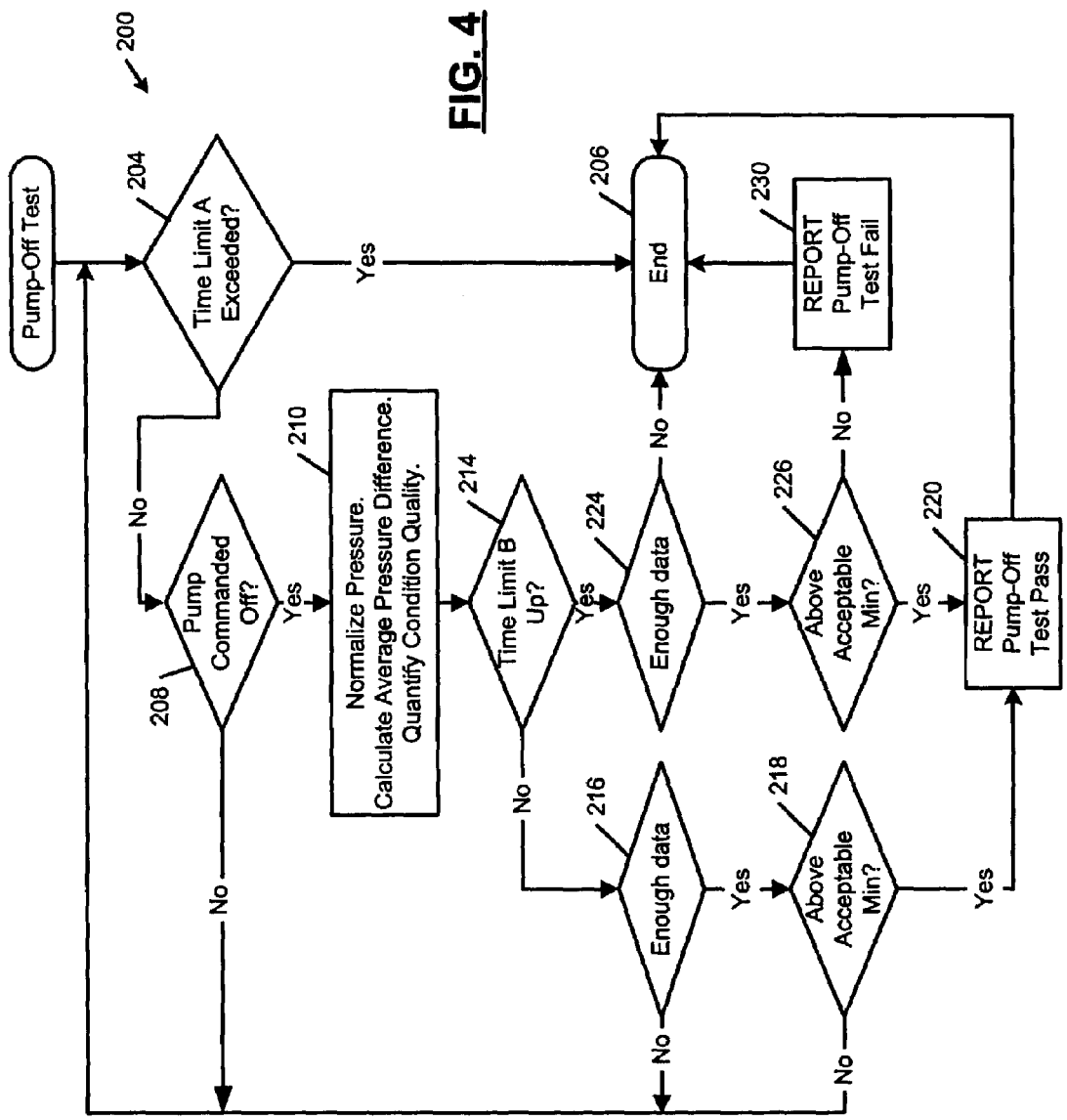

Referring now to FIG. 4, the pump off test is shown generally at 200. Control begins with step 204 where the controller 30 determines whether time limit A has been exceeded. If step 204 is true, control ends in step 206. If step 204 is false, control continues with step 208 where the controller 30 determines whether the pump has been commanded off. If false, control loops back to step 204. If true, control continues with step 210 and normalizes the pressure, calculates average pressure difference, and quantifies condition quality.

In step 214, the controller 30 determines whether time limit B is up. If not, control continues with step 216 where the controller 30 determines whether there is enough data. If not, control loops back to step 204. If there is enough data, control continues with step 218 where the controller 30 determines whether the data is above an acceptable minimum. If not, control loops back to step 204. If step 218 is true, the controller 30 reports pump off test pass in step 220 and control ends in step 206.

If step 214 is true, the controller 30 determines whether there is enough data in step 224. If not, control ends in step 206. If step 224 is true, the controller 30 determines whether the data is above an acceptable minimum in step 226. If not, the controller 30 reports pump off test fail in step 230 and control ends in step 206. If step 226 is true, control continues with step 220.

Figure 5:
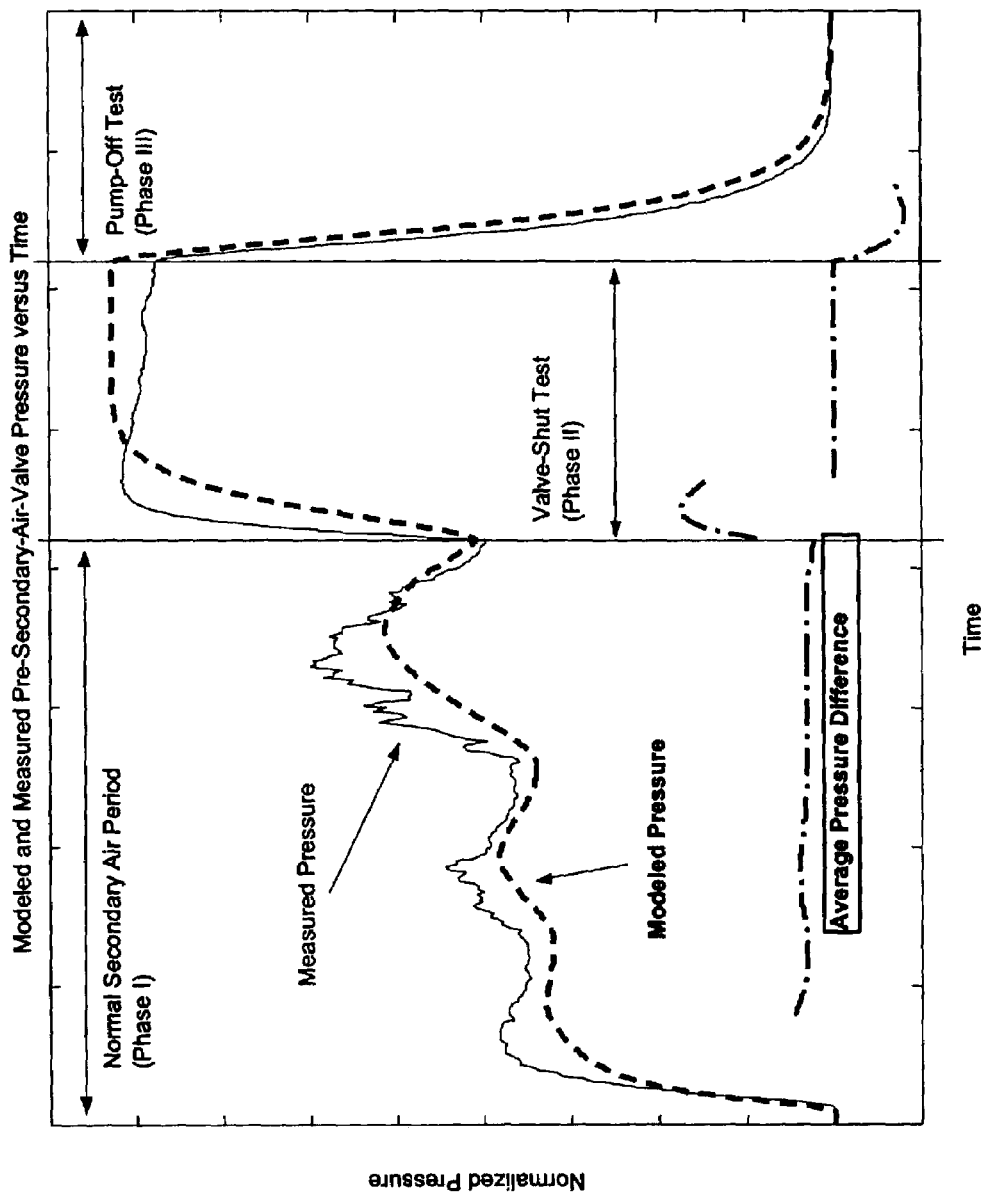
FIG. 5 is a graph illustrating modeled and measured pressure as a function of time.
Figure 6:
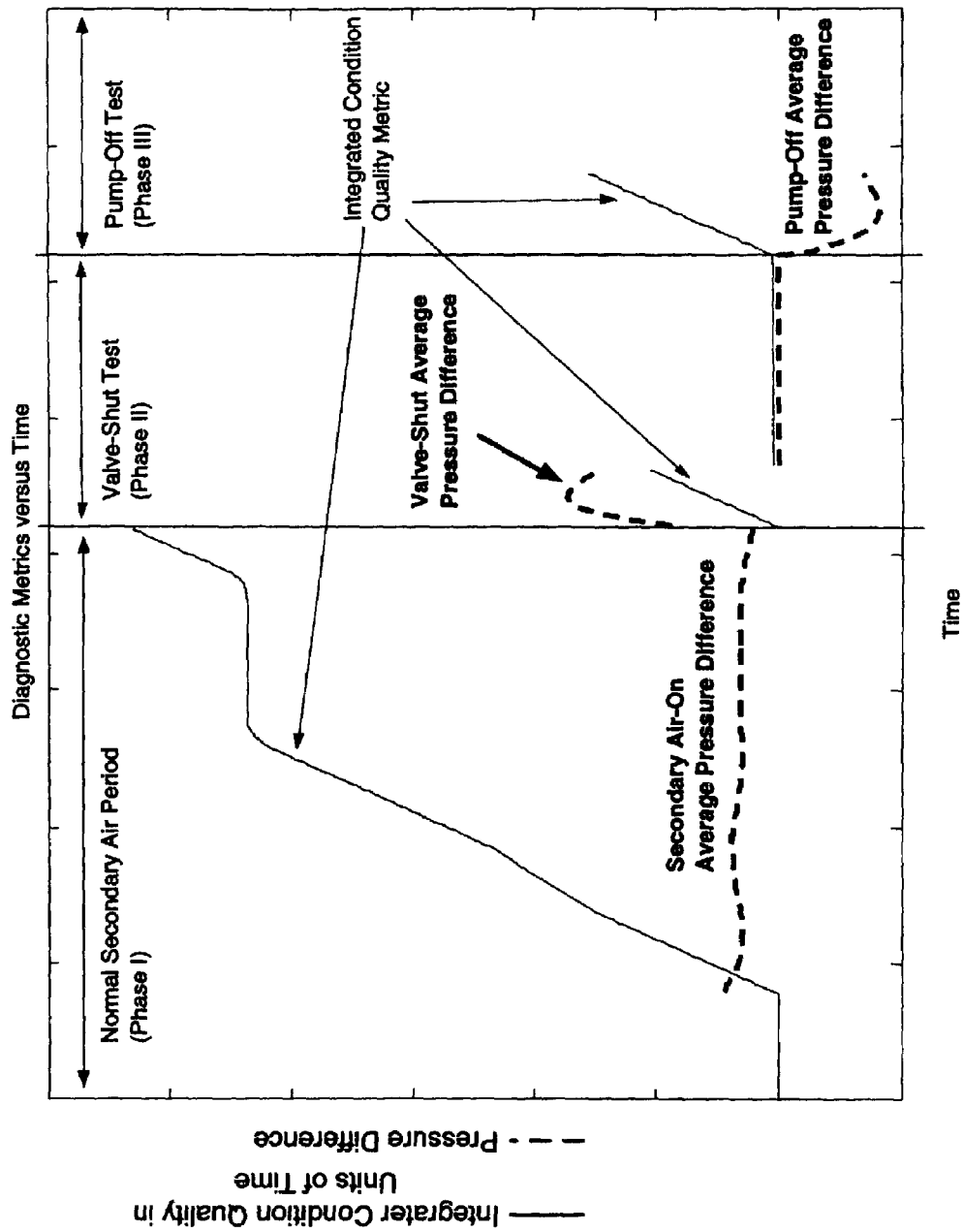
FIG. 6 is a graph illustrating measured pressure and condition quality.

The following sections set forth preferred methods for calculating various parameters. Skilled artisans will appreciate that there are other ways to calculate the parameters without departing from the invention. FIGS. 5 and 6 show predicted pressure, measured pressure and the condition quality. The normalized pressure is calculated as follows: [Normalized Pressure]=[Measured Pressure]−[Measured Pressure Pre-Engine Rotation]. The pressure is modeled according to the following equations. Function "F" is a first order Kalman lag filter with gain "$K_x$", represented by the equation $Un=F(u,K_x)=U_{n-1}+K(u_n-u_{n-1})$. "D" is a fixed time delay of span "$K_y$" during which a change in Boolean "u" subject to $D(u,K_y)$ is postponed.

[Pump Term]=$F(D$(Pump State {off=0, on=1}), $K_1$)×
($K_2$+$K_3$×[System Voltage]+$K_4$×[Barometric Pressure]), $K_5$).

[Valve Term]=$F(D$([Valve State {closed=0, open=1}],
$K_6$)×($K_7$+$K_8$×[Engine Airflow]), $K_9$)

[Modeled Pressure]=$F$([Pump Term]+[Valve Term],
$K_{10}$)

The instantaneous pressure difference is calculated as follows: [Pressure Difference]=[Normalized Pressure]−[Modeled Pressure]. The instantaneous variation between the two pressure sensors on a dual valve system is as follows: [Sensor Variation]= [Normalized Pressure {Valve 1}]−[Normalized Pressure {Valve 2}]. The condition quality is calculated as follows where the notation "$K_n$([variable])" denotes an interpolated tabular constant lookup based on the non-constant "variable,":

$$[\text{Condition Quality}] = \\ K_{11}([\text{Engine Airflow}]) \times K_{12}([\text{System Voltage}]) \times K_{13} \\ ([\text{Barometric Pressure}]) \times K_{14}([\text{Ambient Temperature}]) \times [\text{Pump state} \\ \{off=0, on=1\}] \times [\text{Valve State}\{closed=0, open=1\}] \times \\ [0 \text{ if the pump or valve state was zero less than } K_{15} \\ \text{units of time before the current time, otherwise 1}]$$

$$[\text{Condition Quality Integral}] = \int [\text{Condition Quality}] \cdot dt$$

Since the instantaneous condition quality is unitless, the integral is in seconds. Note, each phase of testing (I, II, III) has different values for $K_{11}$ through $K_{15}$. The condition quality integral is the metric that indicates whether enough information has accumulated. The average pressure difference is the result of the integration based averaging. [Average Pressure Difference]=(∫([Pressure Difference]·[Instantaneous Condition Quality])·dt)÷[Condition Quality Integral]. The average variation between sensors on a dual bank system is averaged the same as the model pressure difference. [Average Sensor Variation]=∫([Sensor Variation]·[Instantaneous Condition Quality])·dt÷[Condition Quality Integral]. The average pressure difference and average sensor variation are compared to calibrations to presume the system status.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for diagnosing system failures in a secondary air injection system that includes a pump that provides air to an exhaust system via a conduit and a valve that controls the flow of air through the conduit, comprising:

measuring pressure in said conduit;

calculating a pump pressure component based on a barometric pressure and a valve pressure component based on a mass air flow (MAF) into an engine to provide a system pressure in said conduit during first, second and third operational phases of said secondary air injection system; and comparing said measured pressure to said system pressure to identify system failures of said secondary air injection system.

2. The method of claim 1 further comprising locating said pressure sensor between said pump and said valve.

3. The method of claim 1 further comprising shutting said valve while said pump is on during said second phase.

4. The method of claim 1 further comprising turning said pump off while said valve is closed during said third phase.

5. The method of claim 1 further comprising reducing emissions during said first phase using said secondary air injection system by opening said valve and turning said pump on.

6. The method of claim 5 further comprising calculating a condition quality during said first phase.

7. The method of claim 6 further comprising calculating a first pressure difference between said measured pressure and said predicted pressure during said first phase.

8. The method of claim 7 further comprising:

calculating an average pressure difference by integrating a product of said first pressure difference and said condition quality;

integrating said condition quality; and dividing said integrated product by said integrated condition quality during said first phase.

9. The method of claim 8 further comprising:

comparing said average pressure difference to first and second thresholds; and declaring system failure if said average pressure difference is one of less than said first threshold and greater than said second threshold.

10. The method of claim 9 further comprising closing said valve while said pump is on during said second phase.

11. The method of claim 10 further comprising:

calculating said average pressure difference;

comparing said average pressure difference to a third threshold; and declaring system failure if said average pressure difference is less than said third threshold.

12. The method of claim 11 further comprising turning said pump off while said valve is closed during said third phase.

13. The method of claim 12 further comprising:

calculating said average pressure difference;

comparing said average pressure difference to a fourth threshold; and declaring system failure if said average pressure difference is greater than said fourth threshold.

14. A diagnostic system for a secondary air injection system that includes a pump that provides air to an exhaust system via a conduit and a valve that controls the flow of air through the conduit, comprising:

a pressure sensor for measuring pressure in said conduit; and a controller that calculates a pump pressure component based on a barometric pressure and a valve pressure component based on a mass air flow (MAF) into an engine to provide a system pressure during first, second and third operational phases of said secondary air injection system and that compares said measured pressure to said system pressure to identify system failures of said secondary air injection system.

15. The diagnostic system of claim 14 wherein said pressure sensor is located between said pump and said valve.

16. The diagnostic system of claim 14 wherein, during said second phase, said valve is shut while said pump is on.

17. The diagnostic system of claim 14 wherein, during said third phase, said pump is turned off while said valve is closed.

18. The diagnostic system of claim 14 wherein, during said first phase, said secondary air injection system is used to reduce emission.

19. The diagnostic system of claim 18 wherein, during said first phase, said controller calculates a condition quality.

20. The diagnostic system of claim 19 wherein, during said first phase, said controller calculates a first pressure difference between said measured pressure and said predicted pressure.

21. The diagnostic system of claim 20 wherein, during said first phase, said controller calculates an average pressure difference by integrating a product of said first pressure difference and said condition quality, integrating said condition quality, and dividing said integrated product by said integrated condition quality.

22. The diagnostic system of claim 21 wherein said controller compares said average pressure difference to first and second thresholds and declares system failure if said average pressure difference is one of less than said first threshold and greater than said second threshold.

23. The diagnostic system of claim 22 wherein, during said second phase, said controller closes said valve while said pump is on.

24. The diagnostic system of claim 23 wherein said controller calculates said average pressure difference, compares said average pressure difference to a third threshold, and declares system failure if said average pressure difference is less than said third threshold.

25. The diagnostic system of claim 24 wherein, during said third phase, said controller turns said pump off while said valve is closed.

26. The diagnostic system of claim 25 wherein said controller calculates said average pressure difference, compares said average pressure difference to a fourth threshold, and declares system failure if said average pressure difference is greater than said fourth threshold.

* * * * *